(12) United States Patent
Yabe

(10) Patent No.: US 10,029,923 B2
(45) Date of Patent: Jul. 24, 2018

(54) WATER TREATMENT DEVICE

(71) Applicant: YTS Science Properties Pte. Ltd., Singapore (SG)

(72) Inventor: Takashi Yabe, Tokyo (JP)

(73) Assignee: MGR Energy LLP, Tokyo (JP)

( * ) Notice: Subject to any disclaimer, the term of this patent is extended or adjusted under 35 U.S.C. 154(b) by 684 days.

(21) Appl. No.: 14/394,033

(22) PCT Filed: Apr. 4, 2013

(86) PCT No.: PCT/JP2013/060281
§ 371 (c)(1),
(2) Date: Oct. 10, 2014

(87) PCT Pub. No.: WO2013/154011
PCT Pub. Date: Oct. 17, 2013

(65) Prior Publication Data
US 2015/0075963 A1 Mar. 19, 2015

(30) Foreign Application Priority Data
Apr. 10, 2012 (JP) .................................. 2012-089708

(51) Int. Cl.
*C02F 1/04* (2006.01)
*C02F 1/12* (2006.01)
(Continued)

(52) U.S. Cl.
CPC .................. *C02F 1/04* (2013.01); *B01D 1/16* (2013.01); *B01D 1/305* (2013.01); *B01D 5/0027* (2013.01);
(Continued)

(58) Field of Classification Search
CPC ... C02F 1/04; C02F 1/048; C02F 1/12; B01D 1/16; B01D 1/305
See application file for complete search history.

(56) References Cited

U.S. PATENT DOCUMENTS 5,096,543 A 3/1992 Elmor
2012/0175237 A1* 7/2012 Yabe ........................ B01D 1/16
202/175

FOREIGN PATENT DOCUMENTS

CN 101918322 12/2010
CN 102249470 11/2011
(Continued)

OTHER PUBLICATIONS

European Patent Office, Application No. 13776192.0, Extended European Search Report dated Nov. 19, 2015.
(Continued)

Primary Examiner — Renee Robinson
(74) Attorney, Agent, or Firm — Wong & Rees LLP; Kirk D. Wong

(57) ABSTRACT

A water treatment system (220) heats raw water, gasifies a portion thereof by an evaporator (34), and condenses the gasified steam at a condensation area (240) to obtain condensed water. The water treatment system (220) includes a heater (32) for heating raw water, a steam conducting part (35, 36) for conducting, to the condensation area (240), steam gasified from the raw water heated by the heater (32), and a pipe (221) for conducting circulating water from the condensation area (240) to the evaporator (34), causing heat exchange between the steam conducted to the condensation area (240) by the steam conducting part (35, 36) and the circulating water, as well as causing heat exchange between the raw water and the circulating water at the evaporator (34).

8 Claims, 11 Drawing Sheets

(51) Int. Cl.
*B01D 1/16* (2006.01)
*B01D 5/00* (2006.01)
*B01D 1/30* (2006.01)
*C02F 103/08* (2006.01)

(52) U.S. Cl.
CPC ............ *C02F 1/048* (2013.01); *C02F 1/12* (2013.01); *C02F 2103/08* (2013.01); *Y02A 20/128* (2018.01); *Y02W 10/37* (2015.05)

(56) References Cited

FOREIGN PATENT DOCUMENTS

| | | |
|---|---|---|
| CN | 102408139 | 4/2012 |
| EP | 1798202 | 6/2007 |
| FR | 2928276 | 9/2009 |
| JP | 2002-515336 | 5/2002 |
| JP | 2008-229424 | 10/2008 |
| JP | 2012-239956 | 12/2012 |
| WO | WO 2009/90785 | 7/2009 |
| WO | WO2009/090785 | 7/2009 |
| WO | WO 2010/29723 | 3/2010 |
| WO | WO 2010/029723 A1 | 3/2010 |
| WO | WO 2011/007405 * | 1/2011 |

OTHER PUBLICATIONS

Chinese Patent Office, Application No. 201380019158.7, Office Action dated Jun. 23, 2015.

* cited by examiner

WATER TREATMENT DEVICE

CROSS-REFERENCE TO RELATED APPLICATIONS: PRIORITY CLAIM

This application is a US National Stage Patent Application filed under 35 U.S.C. § 371 based upon International Patent Application No. PCT/JP2013/060281 filed Apr. 4, 2013, which claims the benefit of Japanese Application 2012-089708, filed Apr. 10, 2012, the entire contents of all of which are hereby incorporated by reference as if fully set forth herein for all purposes.

TECHNICAL FIELD

The present invention relates to a water treatment system, particularly to a water treatment system that gasifies a portion of raw water by heating and condenses the gasified steam to obtain condensed water.

BACKGROUND ART

Conventionally, for this kind of water treatment system, there has been proposed one that converts raw water such as seawater to mist by heating in a chamber, and condenses steam by causing a vapor-liquid contact between air-steam mixture gas, generated while converting the raw water to mist, and spray water, thereby desalinating or purifying the raw water (for example, refer to Patent Literature 1). This water treatment system efficiently heats raw water by causing heat exchange between desalinated or purified condensed water and raw water such as seawater and then heating the raw water with a heater utilizing solar energy.

CITATION LIST

Patent Literature

Patent Literature 1: WO No. 2010/029723.

SUMMARY OF INVENTION

Technical Problem

In such a water treatment system, efficiency in water treatment of desalination or purification is able to be improved by decreasing energy required for a heater to heat raw water.

The present invention is conceived in consideration of such a point. The present invention has an objective to provide a water treatment system with high water treatment efficiency by decreasing energy required for heating raw water with a heater.

Solution to Problem

To achieve the above objective, a water treatment system according to the present invention heats raw water, gasifies a portion thereof at an evaporation area, and condenses gasified steam at a condensation area to obtain condensed water. The water treatment system comprises: a heater heating the raw water; a steam conductor conducting, to the condensation area, steam that is gasified from the raw water heated by the heater; and a circulating water pipe conducting circulating water from the condensation area to the evaporation area, causing heat exchange between the steam that is conducted to the condensation area by the steam conductor and the circulating water, and causing heat exchange between the raw water and the circulating water at the evaporation area.

Further, the circulating water pipe may conduct the circulating water in a direction opposite to a direction in which the steam conductor conducts the steam.

Further, the circulating water pipe may conduct a larger amount of the circulating water per unit time than the condensed water obtained at the condensation area.

Still further, the circulating water pipe may conduct the raw water as the circulating water.

In addition, the water treatment system may further comprise: a heat exchanger heating the raw water and, at the same time, cooling down the condensed water by causing heat exchange between the raw water and the condensed water; and a condensed water conductor conducting at least a portion of the condensed water obtained at the condensation area to the heat exchanger, and causing the condensed water that is cooled down after the heat exchange with the raw water to perform a vapor-liquid contact at the condensation area with the steam gasified from the raw water. The condensed water conductor may conduct the condensed water so that the condensed water that is obtained at an upstream side of a direction in which the steam conductor conducts the steam, from the condensed water obtained at the condensation area, exchanges heat with a downstream side of the raw water passing through the heat exchanger and the condensed water obtained at a downstream side of the direction in which the steam conductor conducts the steam exchanges heat with an upstream side of the raw water passing through the heat exchanger.

Further, the condensed water conductor may divide the condensed water obtained at the condensation area into plural portions according to the direction in which the steam conductor conducts the steam, and conduct the condensed water so that each of the divided condensed water exchanges heat one after another with the raw water passing through the heat exchanger.

Further, the water treatment system may comprise a vaporizer dropping the raw water heated by the heater and gasifying a portion of the raw water at the evaporation area by causing the falling raw water to collide with a collision member. The steam conductor may conduct, from steam gasified by the vaporizer, steam gasified in a vertically upper part to a vertically lower part of the condensation area and steam gasified in a vertically lower part to a vertically upper part of the condensation area.

Still further, the condensed water conductor may drop or spray, from vertically above to the condensation area, the condensed water that is cooled down by the heat exchange with the raw water to cause the condensed water to perform a vapor-liquid contact with the steam gasified from the raw water.

Still further, the condensed water conductor may include: a dropper dropping the condensed water that is cooled down by the heat exchange with the raw water; and a crusher crushing the condensed water droplet, disposed below the dropper.

Further, the condensed water conductor may include a tray with a plurality of holes formed on a bottom, conduct the condensed water that is cooled down by the heat exchange with the raw water to the tray, and drop the condensed water through the plurality of holes.

Furthermore, the condensed water conductor may include a cylindrical member with a plurality of holes formed on a side surface, conduct the condensed water that is cooled down by the heat exchange with the raw water into the cylindrical member, and drop the condensed water through the plurality of holes.

The water treatment system may include a container having the condensation area thereinside, the heat exchanger being disposed outside the container.

The heat exchanger may be a plate-type heat exchanger.

Advantageous Effect of Invention

According to the present invention, a water treatment system with high water treatment efficiency is able to be obtained by improving heat exchange efficiency between desalinated or purified condensed water and raw water such as seawater.

DESCRIPTION OF EMBODIMENTS

Figure 1:
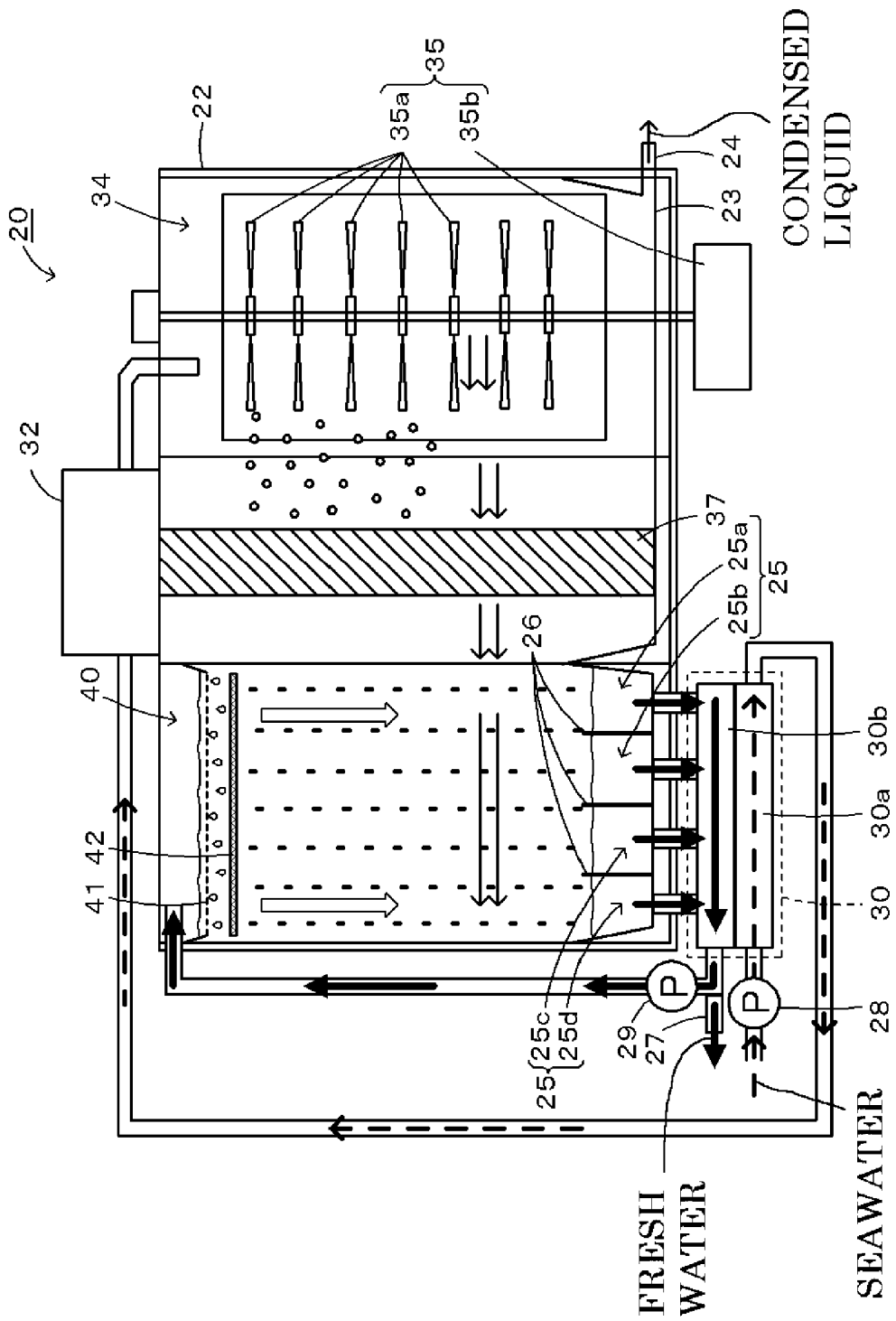
FIG. 1 is a side view schematically showing an outline of a configuration of a water treatment system according to a first embodiment of the present invention.

The following will describe embodiments of the present invention in detail with reference to the drawings.

First Embodiment

A water treatment system 20 according to a first embodiment of the present invention is configured as a device for desalinating or purifying raw water such as seawater and sewage. As shown in the side view of FIG. 1 and the top view of FIG. 2, the water treatment system 20 according to the first embodiment comprises a cylindrical case 22, pumps 28 and 29 for pneumatically feeding raw water and fresh water (condensed water), a heat exchanger 30 for causing heat exchange between raw water and fresh water, a heater 32 for heating raw water, an evaporator 34 for evaporating raw water, and a condenser 40 for condensing steam. It is noted that thin arrows in FIGS. 1 and 2, and FIGS. 7 and 14 to be described later, indicate airflow directions inside the case 22; bold arrows therein schematically indicate directions of fresh-water flows; and dashed arrows therein schematically indicate directions of raw-water flows.

Figure 2:
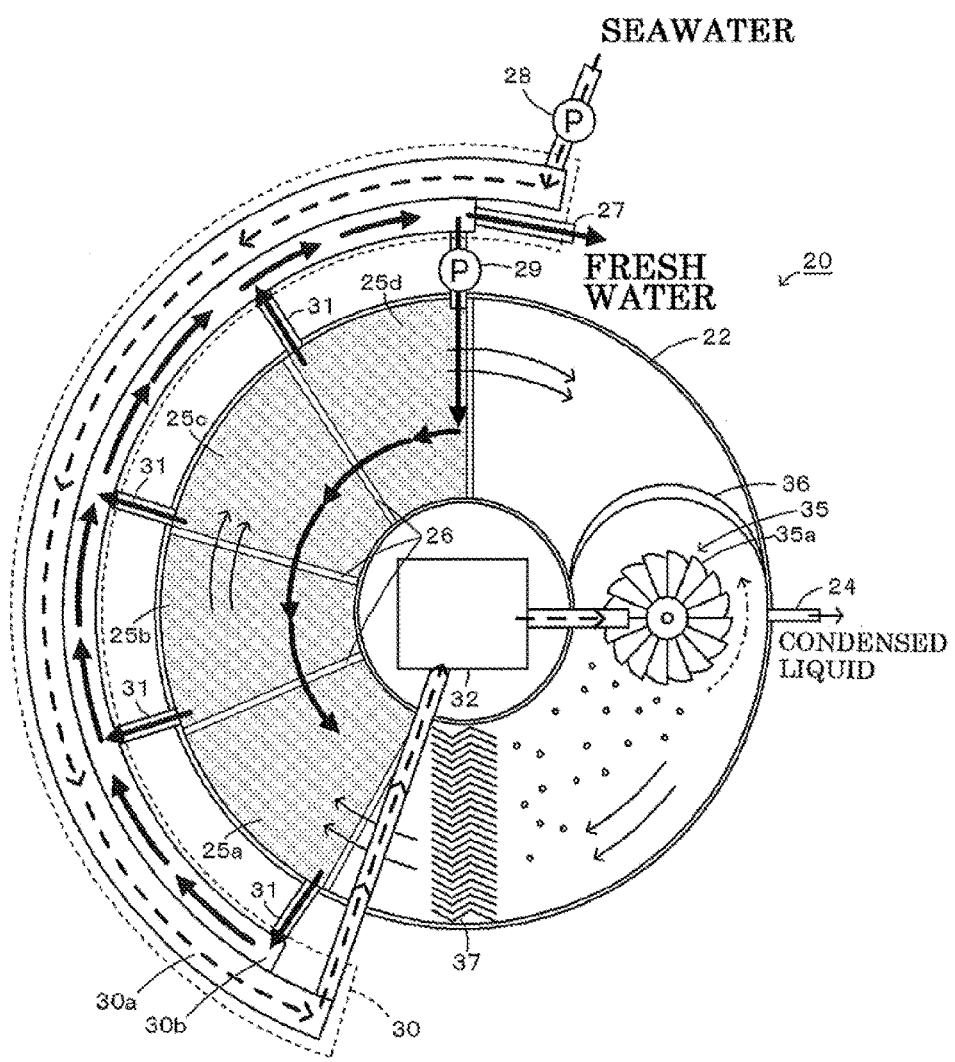
FIG. 2 is a top view schematically showing an outline of the configuration of a water treatment system according to the first embodiment.

The cylindrical case 22 has a donut-shaped (thick cylinder shape) hollow thereinside between an outer cylinder and an inner cylinder, and houses an evaporator 34 and a condenser 40 thereinside Hereinafter, an area where the condenser 40 is disposed in the case 22 is referred to as a "condensation area" (hatched area in FIG. 2). In this embodiment, air circulates in a clockwise direction inside the case 22 when viewed from above as shown in FIG. 2. Hereinafter, an anti-clockwise direction is referred to as an upstream side; and a clockwise direction is referred to as a downstream side.

The case 22 is provided with a liquid pool 23 for collecting raw water fallen from the evaporator 34. The liquid pool 23 is equipped with a drainage pipe 24 in connection with a drainage layer, not shown in the drawings, outside the case 22. In addition, the case 22 is provided with a liquid pool 25 for collecting fresh water (condensed water) obtained at the condensation area. The liquid pool 25 for collecting fresh water is divided into a plurality of sections along the direction of air circulation within the case 22. As an example, in this embodiment, the liquid pool 25 is divided into four liquid pools 25a to 25d with partitions 26 equally spaced from the upstream side in sequence. Fresh water obtained at the condenser 40 is collected in the plurally divided liquid pools 25a to 25d without mixing one another, then, the fresh water is respectively conducted to a heat exchanger 30 through pipes 31. It is noted that the liquid pool 25 only has to be divided into at least two portions along the direction of air circulation within the case 22, without limitation to equally spaced four partitions divided from the upstream side in sequence.

The pump 28 pumps up raw water as a subject to purify or desalinate, for example, from sea and pneumatically feeds the raw water to the heat exchanger 30. Meanwhile, the pump 29 pneumatically feeds the fresh water, that is conducted from the liquid pools 25a to 25d to the heat exchanger 30 and passes through the heat exchanger 30, to the condenser 40. For drive source of the pumps 28 and 29, it is possible to use various kinds of devices including well-known internal-combustion engines that output power by combusting fuel and well-known electric motors such as synchronous motors or induction motors, for example. It is noted that, while the pump 28 for pneumatically feeding raw water is equipped at the upstream side of the heat exchanger 30 in this embodiment, the pump 28 may be equipped at the downstream side of the heat exchanger 30, or at the downstream side of the heater 32.

The heat exchanger 30 has a flow path 30a for flowing raw water and a flow path 30b for flowing fresh water, and causes heat exchange between the raw water and the fresh water obtained at the condenser 40. For the heat exchanger 30, a plate-type or a pipe-type heat exchanger may be employed, for example, and equipped outside the case 22. The flow path 30a of the heat exchanger 30 for flowing raw water is equipped with the pump 28 at the upstream side for pneumatically feeding raw water, and the heater 32 is equipped at the downstream side. Further, the flow path 30b of the heat exchanger 30 for flowing fresh water is equipped with: the pipes 31, sequentially from the upstream side at predetermined intervals, for respectively connecting the liquid pools 25a to 25d to the flow path 30b; and the pump 29, at the downstream side, for pneumatically feeding fresh water to the condenser 40. It is noted that, since the fresh water obtained at the liquid pools 25a to 25d is obtainable by condensing steam that is gasified from raw water, as will be described later in detail, temperature of the fresh water is higher than the raw water pneumatically fed by the pump 28. Thus, heat exchange between the raw water and the fresh water at the heat exchanger 30 transfers heat from the fresh water to the raw water, whereby the raw water is heated while the fresh water is cooled down.

Further, in the heat exchanger 30, the flow paths 30a and 30b for raw water and fresh water are configured so that fresh water obtained at the upper upstream side from the fresh water obtained at the condensation area exchanges heat with the downstream side of the raw water flowing through the heat exchanger 30. Specifically, in this embodiment, the heat exchanger 30 and the liquid pools 25a to 25d are connected by the pipes 31 so that fresh water collected in the liquid pool 25 at the upstream side, from the liquid pools 25a to 25d for collecting fresh water obtained at the condenser 40, is conducted from the upstream side of the flow path 30b and sequentially joined by fresh water collected in the liquid pool 25 at the downstream side (refer to FIG. 2). Thus, the heat exchanger 30 is configured so that heat exchange is performed between the upstream side of the flow path 30a for raw water and the downstream side of the flow path 30b for fresh water and between the downstream side of the flow path 30a for raw water and the upstream side of the flow path 30b for fresh water. It is noted that, while, in FIG. 2, the heat exchanger 30 is formed in an arc shape following the outer profile of the case 22, the heat exchanger 30 may be in a plate form having a planar portion, for example, without limitation thereto. In this embodiment, the heat exchanger 30 enables easier maintenance as the heat exchanger 30 is provided outside the case 22, compared with the one that houses the heat exchanger 30 inside the case 22. This configuration is particularly advantageous when the raw water is saline, as seawater is able to flow outside the pipes.

The heater 32 further heats the raw water heated while passing the heat exchanger 30 to a predetermined temperature (for example, 70° C. to 90° C.). The heater 32 indirectly heats raw water by, for example, heating a medium such as water, then, transferring heat from the medium to the raw water. While, in this embodiment, the heater 32 is disposed vertically above the case 22, the heater 32 may be disposed on the side of the case 22 or any other places. In addition, heating by the heater 32 may be performed by, for example, using solar heat, heating electrically-heated wires, or combusting or oxidizing magnesium or the like in a medium. Further, heating by the heater 32 is not limited to means for indirectly heating raw water through a medium but may be means for directly heating raw water. The raw water heated by the heater 32 is conducted to the evaporator 34 from above of the case 22.

The evaporator 34 gasifies the raw water heated by the heater 32 in the case 22. The evaporator 34 includes a mist generator 35, a guide 36, and a group of demisters 37. The mist generator 35 includes a plurality of fins 35a that rotate around an axis extending in an up-to-down direction (a vertical direction) of the case 22, and a drive source 35b that drives these fins 35a to rotate. It is noted that the drive source 35b is preferably disposed outside of the case 22 so as to prevent raw water from getting therein. When the raw water heated by the heater 32 is conducted to the mist generator 35, the raw water falls toward the fins 35a from above of the case 22, and a portion of the raw water is crushed by colliding with the rotating fins 35a. Further, the raw water becomes fine droplets by being more split up by air pressure through a process of colliding with the fins 35a and spattering, and the droplets are diffused into air in the case 22 as mist. A portion of the diffused mist becomes steam by a natural evaporation. In this way, the mist generator 35 prompts gasification of raw water by converting the heated raw water to mist. Relatively large droplets in the mist and raw water that is not converted to mist fall down to the bottom of the case 22 by gravity, then, are collected in the liquid pool 23 to be drained outside the case 22 via the drainage pipe 24.

The guide 36 is configured, as shown in FIG. 2, as a plate that prevents the raw water spattered from the mist generator 35 from reaching the upstream side beyond the guide 36 and conducts the mist to the downstream side (a clockwise direction). As described above, the mist generator 35 of this embodiment converts raw water to mist by causing the raw water to collide with the plurality of rotating fins 35a, whereby the raw water spatters in every direction via the fins 35a. The guide 36 is disposed at the upstream side of the mist generator 35 and conducts the raw water spattered toward the upstream side, from the raw water spattered from the mist generator 35, to the downstream side. Further, the guide 36 is formed so that air that flows in a clockwise direction through the heat exchanger 30 is able to pass through the guide 36, thus, the guide 36 and the mist generator 35 generate a clockwise air flow within the case 22. Here, in this embodiment, the guide 36 and the mist generator 35 correspond to the "steam conductor" of the present invention.

The group of demisters 37 is disposed at the downstream side (a clockwise direction) of the mist generator 35 and remove mist contained in the air passing through the group of demisters 37. The group of demisters 37 is configured by a plurality of plates extending from the bottom of the case 22 to the roof thereof. The plurality of plates are each formed in a plate shape with a plurality of peaks and grooves when viewed from above, and arranged in parallel with one another with a predetermined gap therebetween so as to allow air to flow between the plurality of plates. The air passing through such a group of demisters 37 collides with the plurality of plates of the group of demisters 37, and mist contained in the colliding air is attached to the plates to be removed from the air. The mist removed by the group of demisters 37 falls down to the bottom of the case 22 by gravity, then, is collected in the liquid pool 23 to be drained outside the case 22 via the drainage pipe 24. Thus, the air that is conveyed to the downstream side contains only steam by passing through the group of demisters 37. It is noted that, as a portion of the raw water is gasified by being converted into mist, water drained through the drainage pipe 24 is fluid concentrate with high rate of foreign substances, compared to raw water (for example, if the raw water is seawater, the foreign substances are sodium chloride, magnesium chloride, and the like).

Figure 3:
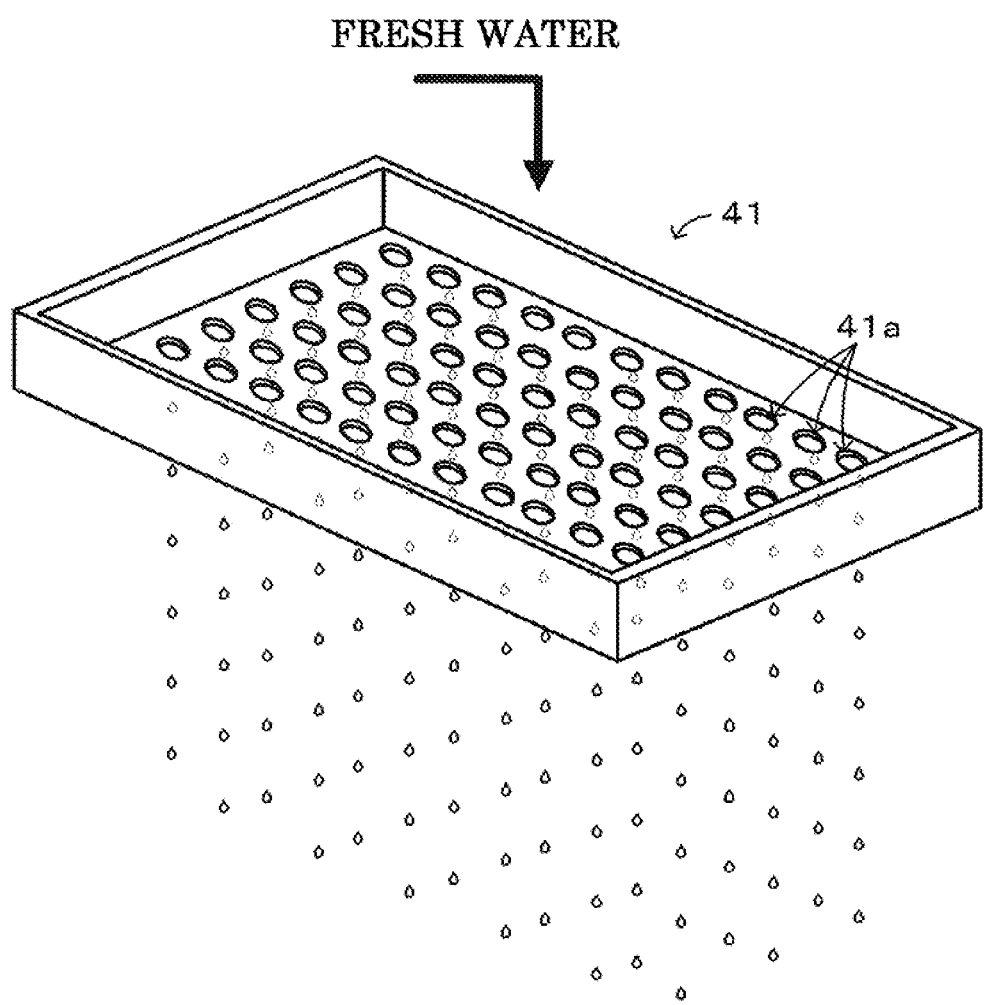
FIG. 3 is a perspective view showing an example of a tray for dropping water to a condensation area.

The condenser 40 conducts the fresh water that passes through the heat exchanger 30 to the condensation area to cause a vapor-liquid contact between the fresh water and the air circulating inside the case 22. As shown in FIG. 1, in this embodiment, the condenser 40 includes a tray 41 and a mesh plate (a crusher) 42. The tray 41, as shown in FIG. 3, is formed as a box, where a plurality of holes 41a are formed on the bottom, and disposed vertically above the condensation area inside the case 22. Here, the plurality of holes 41a formed on the tray 41 is formed so that the fresh water conducted to the tray 41 drops to the condensation area by gravity, and sizes and number of the plurality of holes 41a are arbitrary.

The mesh plate 42 is disposed vertically below the tray 41. For example, it is possible to use a metal gauze with a plurality of holes formed in a reticular pattern for the mesh plate 42. The mesh plate 42 collides with the fresh water dropped from the tray 41, crushes the fresh water, and conducts the fresh water to the condensation area.

In the condenser 40, the fresh water that is cooled down by passing through the heat exchanger 30 is conducted to the tray 41 by the pump 29, then, the fresh water conducted to the tray 41 drops through the plurality of holes 41a of the tray 41. The dropped fresh water collides with the mesh plate 42 and is crushed into fine droplets which fall down through the condensation area inside the case 22. It is noted that, in this embodiment, the pipes 31 for conducting the fresh water collected in the liquid pools 25a to 25d to the heat exchanger 30, the pump 29 for conducting the fresh water that passes through the heat exchanger 30 to the condenser 40, and the condenser 40 for conducting the fresh water to the condensation area inside the case 22 correspond to the "condensed water conductor" of the present invention.

Next, an operation of the water treatment system 20 in this embodiment will be described. In the water treatment system 20, raw water pumped up from sea or the like by the pump 28 is pneumatically fed to the heat exchanger 30, as well as fresh water collected in the liquid pools 25a to 25d is conducted to the heat exchanger 30 via the pipes 31. The raw water and the fresh water pneumatically fed to the heat exchanger 30 exchange heat. Heat is transferred from the fresh water to the raw water and, as a result, the raw water is heated while the fresh water is cooled down. The raw water heated by passing through the heat exchanger 30 is conducted to the heater 32 to be further heated. Subsequently, the raw water is conducted to the mist generator 35 of the evaporator 34, and diffused as mist to air inside the case 22 by the mist generator 35. Then, a portion of the diffused mist becomes steam by natural evaporation.

Inside the case 22, the air that contains mist generated from the raw water and steam, moving inside the case 22 to pass through the group of demisters 37, and having the mist removed therefrom, becomes air that contains steam only. When this air reaches the condensation area inside the case 22, the air containing steam is brought into a vapor-liquid contact with the fresh water conducted to the condensation area by the condenser 40, whereby the steam is condensed and fresh water is obtained.

The fresh water obtained by condensing steam is collected in the liquid pools 25a to 25d, together with the fresh water conducted to the condensation area by the condenser 40, and conducted to the heat exchanger 30 through the respective pipes 31, where the fresh water exchanges heat with raw water. As the fresh water collected in the liquid pools 25a to 25d is collected by condensing the steam gasified from the heated raw water, temperature of the fresh water is higher than raw water, thus, heat is transferred from the fresh water to the raw water. Overflowed portion of the fresh water that passes through the heat exchanger 30 is collected in an external water tank, not shown in the drawings, through the catchment pipe 27. Further, a portion of the fresh water that passes through the heat exchanger 30 is conducted to the tray 41 of the condenser 40 by the pump 29, dropped from the tray 41, converted to fine droplets by the mesh plate 42, and conducted to the condensation area. Then, the fresh water conducted to the condensation area by the condenser 40 is brought into a vapor-liquid contact with the air containing steam and circulating inside the case 22, thereby condensing the steam, and re-collected in the liquid pools 25a to 25d. In this way, it is possible for steam to be efficiently condensed by causing a vapor-liquid contact between fresh water and steam at the condensation area. Moreover, in this embodiment, fresh water is dropped from the tray 41 using a tray 41 where a plurality of holes 41a is formed on the bottom. Thus, it is possible to perform a vapor-liquid contact at the condensation area with a simple configuration. Further, since a mesh plate 42 for crushing the fresh water dropped from the tray 41 into fine droplets is equipped vertically below the tray 41, it is possible for the fresh water and the steam to be efficiently brought into a vapor-liquid contact.

Here, the steam passing through the condensation area is cooled down by a vapor-liquid contact with the fresh water conducted by the condenser 40, thus, the steam contained in the air is more cooled down toward the downstream side. As a result, the fresh water obtained at the condensation area has higher temperature when the fresh water is obtained at the upper upstream side in the air circulation direction within the case 22, and the fresh water obtained at the condensation area has lower temperature when the fresh water is obtained at the lower downstream side. In this way, as the fresh water obtained at the condensation area has a temperature gradient, the water treatment system 20 of this embodiment includes plurally-divided liquid pools 25a to 25d in the case 22 along the air circulation direction inside the case 22. Thereby, fresh water collected in the liquid pools 25a to 25c at the upstream side has higher temperature, while fresh water collected in the liquid pools 25b to 25d at the downstream side has lower temperature, without mixing the obtained fresh water to equalize the temperature. Moreover, the fresh water with lower temperature collected in the liquid pools 25c and 25d at the downstream side (note that the temperature is higher than raw water) exchanges heat with the upstream side of the raw water flowing in the heat exchanger 30, while the fresh water with higher temperature collected in the liquid pools 25a and 25b at the upstream side exchanges heat with the downstream side of the raw water flowing in the heat exchanger 30. Thereby, it is possible for the fresh water obtained at the condensation area to efficiently exchange heat with raw water, enabling energy reduction in heating raw water by the heater 32 to improve water treatment performance of the water treatment system.

Further, in this embodiment, the fresh water collected in the liquid pools 25a to 25d is configured to be conducted, sequentially from the fresh water obtained at the upstream side of the condensation area, via the pipes 31 to the heat exchanger 30 and join one another. As the fresh water passing through the heat exchanger 30 is pneumatically fed toward the condenser 40 by the pump 29, the single pump 29 is able to conduct the fresh water to the condenser 40, which promotes downsizing of the water treatment layer 10 and saving energy.

As an example, in the water treatment system 20 of this embodiment, when fresh water collected in the liquid pools 25a to 25d are 92° C., 90° C., 88° C., and 86° C. in order from the upstream side of the air circulation direction inside the case 22, it is possible for the raw water to be ideally heated up to 92° C. by sequentially exchanging heat with the fresh water from the fresh water with the lowest temperature. On the other hand, when the liquid pool 25 is not divided, temperature of fresh water collected in the liquid pool 25 is equalized and becomes, for example, 89° C., thus, it is not possible for the raw water to be heated up to 92° C. by exchanging heat with fresh water. In this way, in this embodiment, fresh water obtained at the condensation area is collected by being plurally-divided along the circulating direction of steam inside the case 22. Then, the fresh water collected at the downstream side exchanges heat with the upstream side of the raw water passing through the heat exchanger 30, while the fresh water collected at the upstream side exchanges heat with the downstream side of the raw water passing through the heat exchanger 30. Thus, heat exchange between the fresh water obtained at the condensation area and raw water is efficiently performed, improving water treatment performance.

The water treatment system 20 of the above-described first embodiment enables to improve water treatment performance by efficiently causing heat exchange between the fresh water obtained at the condensation area and raw water, as the configuration allows the fresh water obtained at the upstream side of the air circulation direction inside the case 22 to exchange heat with the downstream side of the raw water passing through the heat exchanger 30, and the fresh water obtained at the downstream side to exchange heat with the upstream side of the raw water passing through the heat exchanger 30.

Second Embodiment

Figure 4:
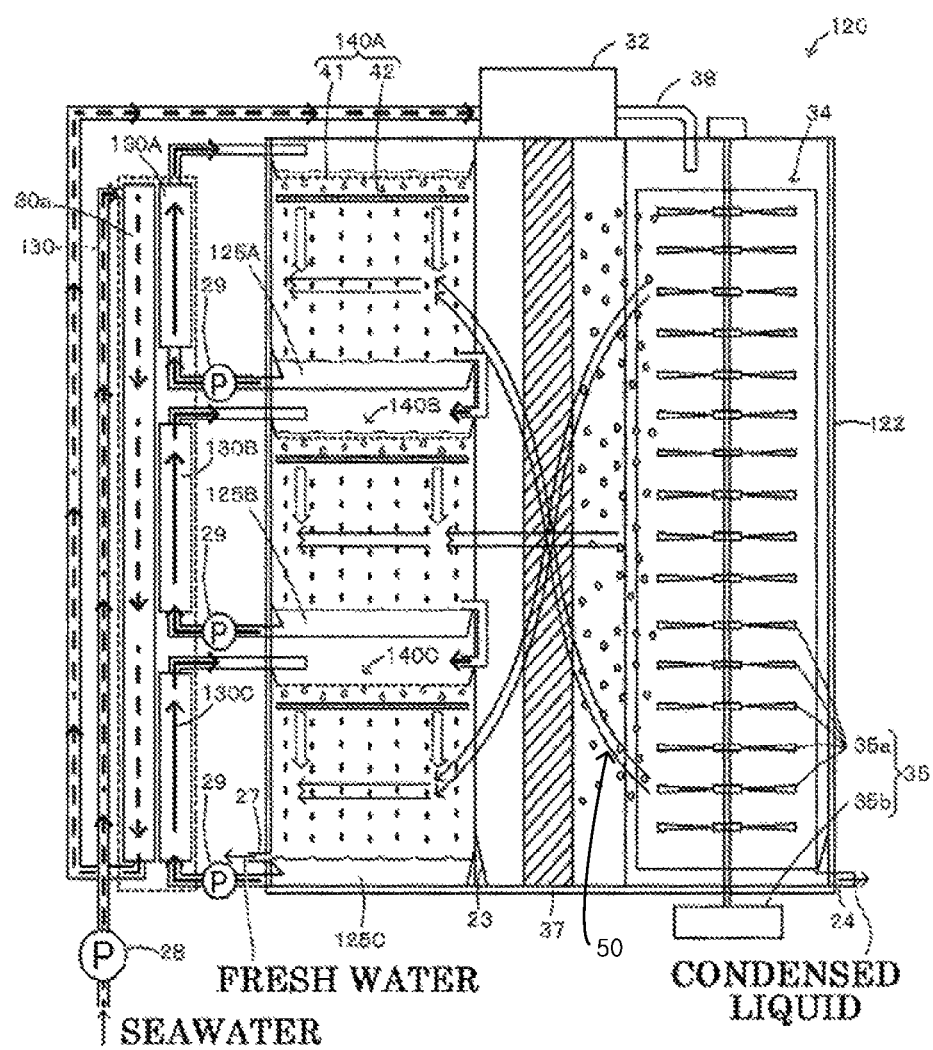
FIG. 4 is a side view schematically showing an outline of a configuration of a water treatment system according to a second embodiment of the present invention.

A water treatment system 120 according to a second embodiment of the present invention is configured as a multi-stage system with which the condenser 40 and the liquid pool 25 of the first embodiment are plurally disposed in a vertical direction, as shown in FIG. 4. The water treatment system 120 according to the second embodiment comprises a cylindrical case 122, pumps 28 and 29 for pneumatically feeding raw water and fresh water (condensed water), a heat exchanger 130 for causing heat exchange between raw water and fresh water, a heater 32 for heating raw water, an evaporator 34 for evaporating raw water, condensers 140A to 140C for condensing steam, and an airflow guide 50 for vertically exchanging airflow inside the case 122. It is noted that configurations of the pumps 28 and 29, the heater 32, and the evaporator 34 are the same as those in the first embodiment, and overlapping explanation will be omitted.

The case 120 is formed in a cylindrical shape with a donut-shaped hollow thereinside. Unlike the first embodiment, the case 120 is plurally-divided in a vertical direction at the condensation area, and a plurality of liquid pools 125A to 125C are arranged in a vertical direction. It is noted that the case 120 is not vertically divided in the area other than the condensation area. As an example, in the example shown in FIG. 4, the case 120 is vertically divided into three at the condensation area, forming three liquid pools 125A to 125C. The liquid pools 125A to 125C are respectively coupled to the heat exchanger 130 through the pumps 29. It is noted that the pumps 29 may be disposed at the downstream side of the heat exchanger 130 in the same way as the first embodiment. Further, the vertically upward liquid pools 125A and 125B are configured so as to conduct overflowed fresh water to lower condensers 140B and 140C. The vertically lowest liquid pool 125C is configured so that overflowed fresh water is collected in a water tank, not shown in the drawings, outside the case 22 through a catchment pipe 27. It is noted that the case 120 is not limited to the one with a condensation area vertically divided into three layers, and the condensation area may be vertically divided into two layers or four or more layers.

The heat exchanger 130 is configured to cause heat exchange between raw water pneumatically fed by the pump 28 and the fresh water obtained at the condensation area and pneumatically fed by the pumps 29. The heat exchanger 130 is configured so that fresh water collected in the vertically upward liquid pool 125A, from fresh water obtained at the condensation area, exchanges heat with the upstream side of the raw water passing through the heat exchanger 130, and fresh water collected in the vertically downward liquid pool 125C exchanges heat with the downstream side of the raw water passing through the heat exchanger 130.

In accordance with the condensation area of the case 120, plurally-divided in a vertical direction, condensers 140A to 140C are disposed above the respective divided areas. In the same way as the condenser 40 in the first embodiment, each of the condensers 140A to 140C includes a tray 41 and a mesh plate 42 so as to conduct the fresh water that passes through the heat exchanger 130 to a condensation area.

Figure 5:
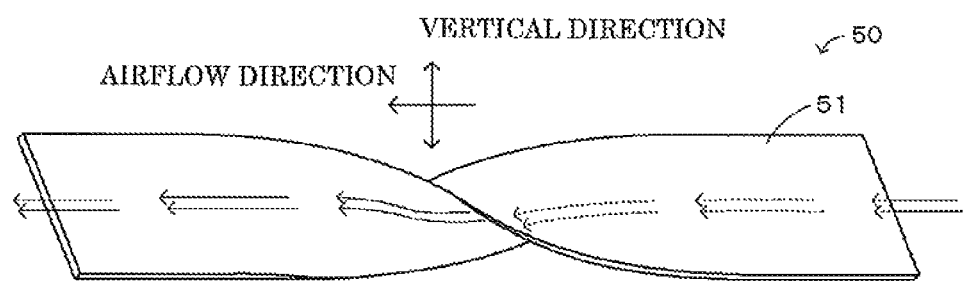
FIG. 5 is a perspective view showing an outline of a flow change board for vertically exchanging airflows.

The airflow guide 50 is configured so as to vertically divide air circulating inside the case 120 into a plurality of layers and vertically exchange the air. As shown in FIG. 5, the airflow guide 50 includes a guide plate 51, a plate surface of which is twisted by 180 degrees around a rotation axis extending along the airflow circulating inside the case 120. In an example of FIG. 5, air flowing along a vertically upward surface of one sheet of the guide plate 51 is guided to vertically downward of the guide plate 51, while, to the contrary, air flowing along a vertically downward surface of the guide plate 51 is guided to vertically upward of the guide plate 51 following the surface of the guide plate 51.

Figure 6:
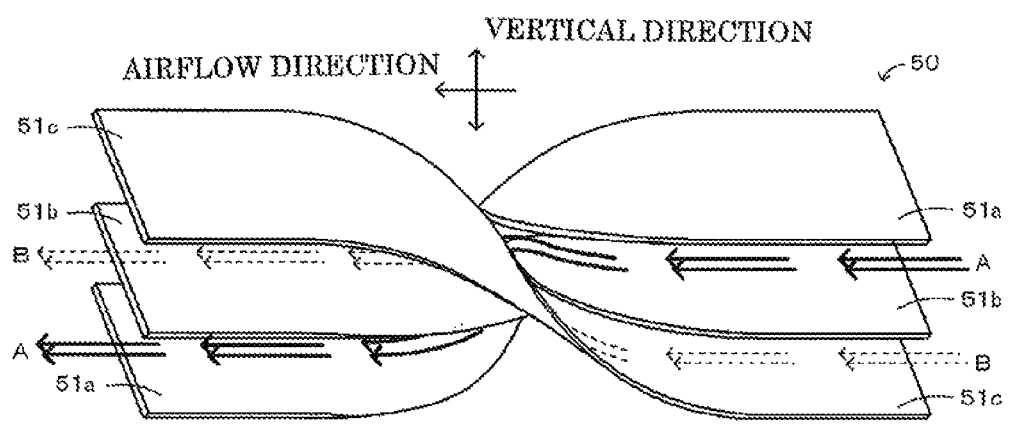
FIG. 6 is an explanatory view illustrating a plurality of airflows being vertically exchanged.

Further, as shown in FIG. 6, when a plurality of guide plates 51a to 51c are provided, airflow circulating inside the case 120 is possible to be vertically divided into a plurality of layers to be exchanged one another. The plurality of guide plates 51a to 51c is configured in a spiral manner in which vertically stacked plate members are twisted by 180 degrees around a common rotation axis extending along the direction of the airflow circulating inside the case 120. According to such guide plates 51a to 51c, a flow path A between the guide plate 51a and the guide plate 51b and a flow path B between the guide plate 51b and the guide plate 51c turn upside down when air flows from right to left in FIG. 6. Further, by increasing the number of guide plates 51, the airflow circulating inside the case 120 is able to be vertically divided into a plurality of layers to be exchanged one another. Specifically, when there are provided (N+1) sheets of spiral guide plates 51 (N is an arbitrary natural number) that are twisted by 180 degrees around the common rotation axis extending along the direction of air circulation, the airflow circulating inside the case 120 is able to be vertically divided into N layers to be vertically exchanged one another.

In this embodiment, it is configured that the airflow guide 50 conducts steam generated at vertically upward side, from the steam generated at the evaporator 34, to vertically downward side of the condensation areas, while conducting steam generated at vertically downward side to vertically upward side of the condensation areas. It is noted that the airflow guide 50 may be disposed at the upstream side of the group of demisters 37, or the downstream side thereof. Further, the airflow guide 50 may also function as the group of demisters 37.

In the water treatment system 120 of the second embodiment, in the same way as the water treatment system 20 of the first embodiment, raw water and fresh water are conducted to the heat exchanger 130, and the raw water is heated by heat transferred from the fresh water. The raw water heated while passing through the heat exchanger 130 is further heated by the heater 32, conducted to the mist generator 35 of the evaporator 34, and diffused by the mist generator 35 as mist to the air inside the case 22. Then, a portion of the diffused mist becomes steam by natural evaporation. Inside the case 22, the air that contains mist generated from the raw water and steam, moving inside the case 22, passing through the group of demisters 37, and having the mist removed therefrom, becomes air that contains steam only. This air is turned upside down by the airflow guide 50 and conducted to the vertically multi-layered condensation areas. Then, the air containing steam is brought into a vapor-liquid contact at each layer of the condensation areas with the fresh water conducted to the condensation areas by the condensers 140A to 140C, whereby steam contained in the air is condensed to become fresh water.

The fresh water obtained by condensing steam is collected in the liquid pools 125A to 125C, and a portion thereof is pneumatically fed to the heat exchanger 130 by the pumps 29 and exchanges heat with raw water. The fresh water drained from the heat exchanger 130 is conducted respectively to the layers of the condensers 140A to 140C where the fresh water has been collected, and then conducted to the condensation areas again. Then, the fresh water conducted to the condensation areas by the condensers 140A to 140C is brought into a vapor-liquid contact with the air containing steam and circulating inside the case 22, thereby condensing steam, and re-collected in the liquid pools 125A to 125C. Then, fresh water overflowed from the liquid pools 125A and 125B is conducted to the condensers 140B and 140C located at one layer below, while fresh water overflowed from the lowest layer of the liquid pool 125C is collected in an external water tank through the catchment pipe 27.

In the water treatment system 120 of the second embodiment, in the same way as the water treatment system 20 of the first embodiment, raw water heated by the heater 32 is conducted to the mist generator 35, and converted to mist by falling and colliding with a plurality of fins 35a. A portion of the raw water is gasified in association with the mist conversion. Since temperature of the raw water decreases only by the heat of evaporation when the portion of the raw water is gasified, the temperature decreases as the raw water falls toward the vertically downward direction while colliding with the plurality of fins 35a. For this reason, the temperature of the steam generated by the evaporator 34 is higher toward vertically upward and lower toward vertically downward.

Meanwhile, the fresh water, that passes through the heat exchanger 130 and is conducted to the condensation areas by the condensers 140A to 140C, gains heat from steam at the condensation areas by a vapor-liquid contact with the steam. At the same time, temperature of the fresh water increases by condensation heat of the steam, whereby the temperature of the fresh water increases as it falls. Thus, the fresh water conducted to the condensation areas by the condensers 140A to 140C, has a lower temperature toward vertically upward and higher temperature toward vertically downward.

Here, since the water treatment system 120 of the second embodiment is provided with an airflow guide 50 that conducts steam generated at a vertically upward part, from the steam generated by the evaporator 34, to vertically downward and conducts steam generated at a vertically downward part to vertically upward, it is possible for steam with a higher temperature, from the steam generated by the evaporator 34, to be conducted to the lower layer condensation area, and for steam with a lower temperature to be conducted to the upper layer condensation area. Then, the fresh water obtained at the upper layer condensation area and collected in the liquid pool 125A exchanges heat with the upstream side of the raw water passing through the heat exchanger 130, while the fresh water obtained at the lower layer condensation area and collected in the liquid pool 125C exchanges heat with the downstream side of the raw water passing through the heat exchanger 130. In this way, heat exchange with raw water takes place from the fresh water with the lower temperature to the fresh water with the higher temperature, thus, it is possible for the fresh water obtained at the condensation areas and raw water to efficiently exchange heat, improving water treatment performance.

Figure 7:
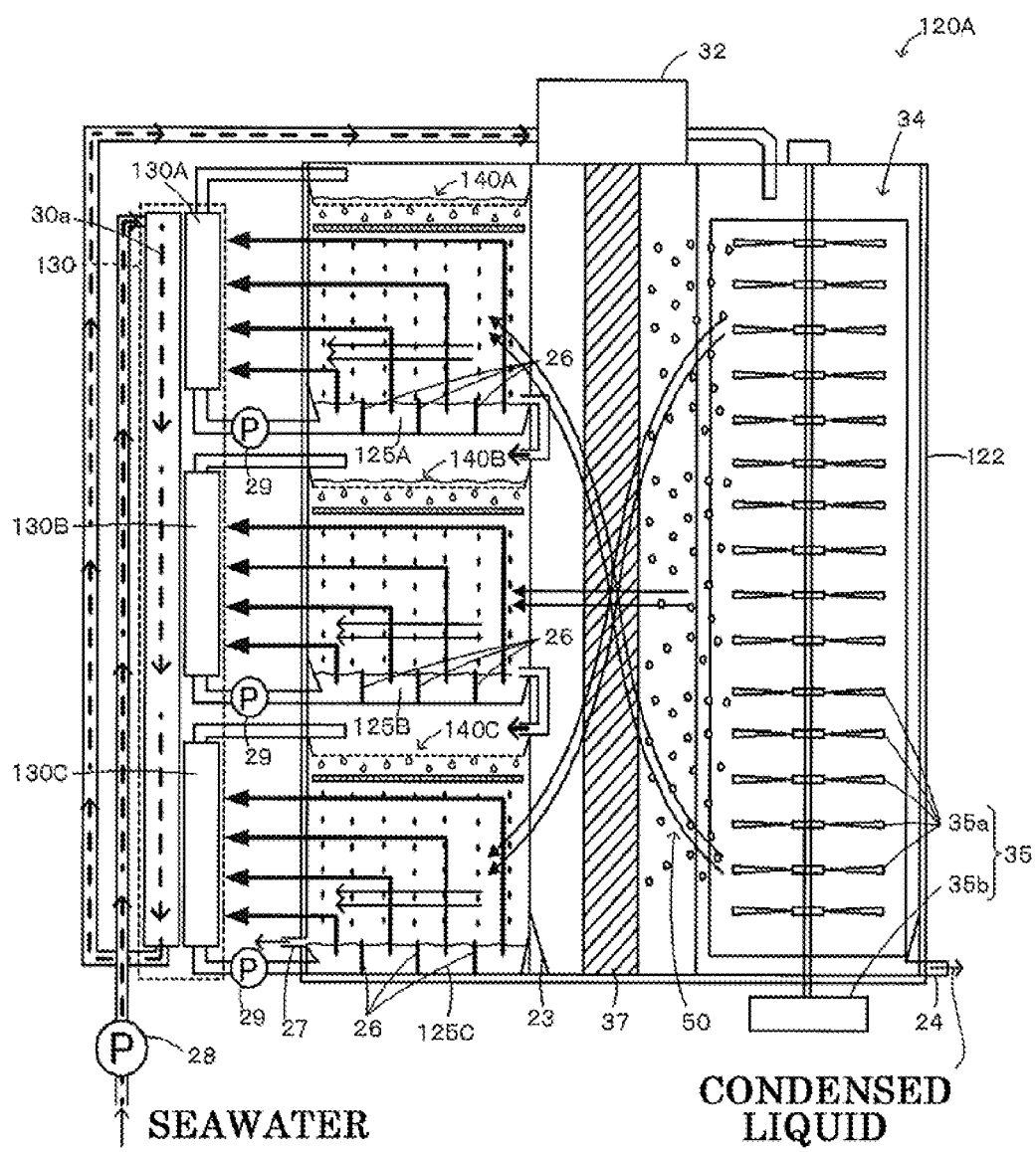
FIG. 7 is a side view schematically showing an outline of a configuration of an alternative water treatment system.

While, in the water treatment system 120 of the second embodiment, each layer of the liquid pools 125A to 125C is not divided along the circulating direction of the air inside the case 122, as shown in an alternative water treatment system 120A of FIG. 7, each layer of the liquid pools 125A to 125C may be divided with partitions 26 along the circulating direction of the air inside the case 122 in the same way as the liquid pool 25 in the water treatment system 20 of the first embodiment. In this way, by dividing each layer of the liquid pools 125A to 125C along the circulating direction of the air inside the case 122, as well as configuring to cause heat exchange between the fresh water obtained at the upstream side of the circulating direction of the air inside the case 122 and the downstream side of the raw water passing through the heat exchanger 130, and the fresh water obtained at the downstream side thereof and the upstream side of the raw water passing through the heat exchanger 130 in the same way as the water treatment system 20 of the first embodiment, it is possible for the fresh water obtained at the condensation areas and raw water to further efficiently exchange heat, improving water treatment performance.

Further, while the water treatment system 120 of the second embodiment is provided with an airflow guide 50 for conducting steam generated at a vertically upward part, from the steam generated by the evaporator 34, to vertically downward and conducting steam generated at a vertically downward part to vertically upward, the water treatment system with multiple stages is not limited to the one with such an airflow guide 50. For example, the case 120 is possible not to be vertically divided in the area only where the mist generator 35 is provided, while vertically divided in the other areas, and the air containing mist generated from raw water at each stage and steam may be conducted to the condensation area of the same stage.

Third Embodiment

Next, a water treatment system 220 according to a third embodiment of the invention will be described. The water treatment system of this embodiment, as well as the first and second embodiments, heats seawater, evaporates the seawater by an evaporator 34, and condenses the steam at the condensation area 240 to obtain distilled water (fresh water) (hereinafter, referred to as the evaporation method). In the evaporation method, it is necessary to heat a larger amount of seawater than distilled water to be obtained. For example, as shown in an explanatory view of FIG. 8, suppose that air containing steam with temperature Thot is cooled down at the condensation area to temperature Tcold, and the air is circulated again to the evaporation area. Here, when temperature Thot is 95° C., an amount of saturated steam in air becomes 497.7 g/m³, while, when temperature Tcold is 40° C., an amount of saturated steam in air becomes 50.7 g/m³. Now, when the air circulates a passage of 50 cm×50 cm at a flow rate of 3 m/s, a flow volume of the circulating air is 2700 m³/h (per hour). In such a case, when the air at 95° C. containing the amount of saturated steam is cooled down to 40° C., the obtained amount of distilled water Z becomes 1.2 ton/h. As latent heat of evaporation and condensation of water is 2400 J(joule)/g, the latent heat EL generated from the amount of the distilled water Z will be expressed by the following formula (1):

$$EL = 2400 \cdot Z \text{ [MJ (mega joule)/h]}. \tag{1}$$

On the other hand, the evaporation area needs seawater at temperature Theat by adding heat EL to seawater so that air will contain steam. If the evaporation area increases the temperature of seawater by $\Delta T[° C.]$, sensible heat ES that realizes temperature difference $\Delta T$ will be expressed by the following formula (2), where inflow of seawater is defined as X [ton/h]:

$$ES = 4.2 \cdot \Delta T \cdot X \text{ [MJ/h]}. \tag{2}$$

If temperature of seawater is heated up to Theat=100° C., and the air containing steam reaches Thot=95° C. by evaporation of the seawater, it is required to heat by the temperature difference $\Delta T=5° C.$ at the evaporation area, where the sensible heat ES becomes 21·X [MJ/ton]. To make the sensible heat ES and latent heat EL equal, X=137 ton/h is required for the amount of distilled water Z=1.2 ton/h. In other words, to gain 1.2 tons of fresh water, 137 tons of seawater, as much as 114-fold of the fresh water, needs to be heated. When compared with desalination devices using a reverse osmotic membrane (hereinafter, referred to as RO), which has efficiency of 6 kWh/(1 ton of fresh water), the evaporation method has efficiency of 670 kWh/(1 ton of fresh water) calculated from the formula (1). Although the evaporation method is able to improve efficiency for the number of stages by having a plurality of stages as described in the second embodiment, even when ten stages are provided to gain ten-fold efficiency, the method is still inferior to RO in efficiency.

Figure 8:
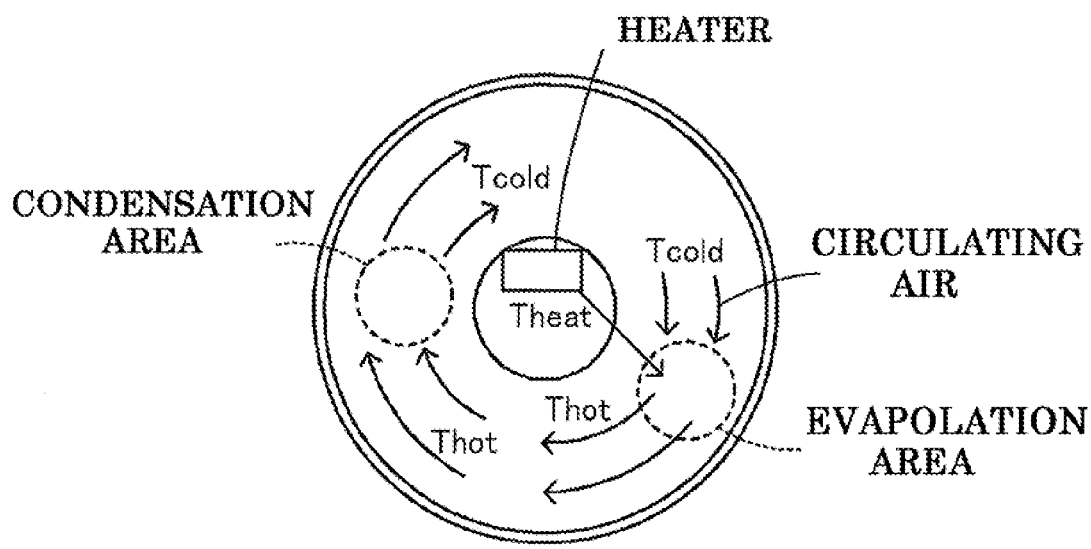
FIG. 8 is a diagram illustrating a temperature change of circulating air in a water treatment system.
Figure 9:
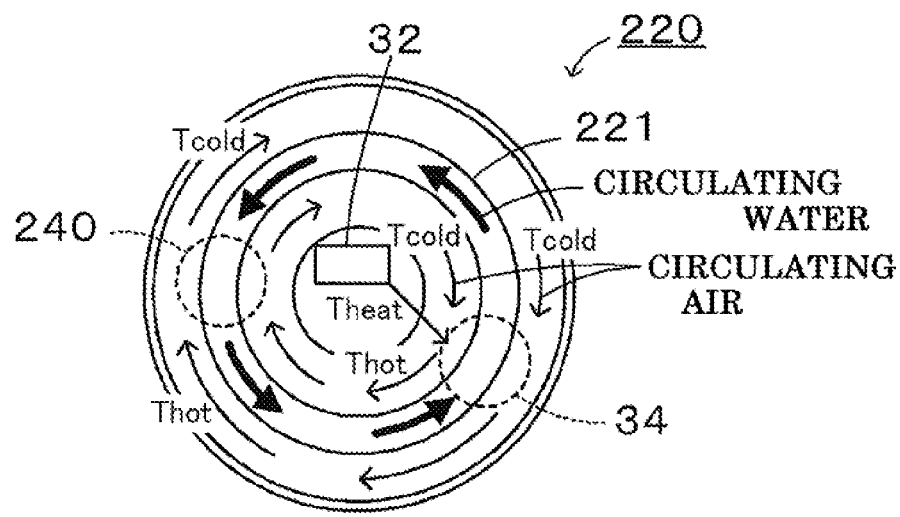
FIG. 9 is a diagram illustrating a water treatment system according to a third embodiment.

To improve efficiency of the evaporation method, collection of latent heat generated at the condensation area 240 is suggested for reuse as shown in the water treatment system 220 according to the third embodiment in FIG. 9. A difference between FIG. 8 and FIG. 9 is a pipe 221, arranged in the airflow path, through which liquid flows in the opposite direction to the airflow. The liquid flowing inside this pipe 221 is called circulating water. The circulating water may be either seawater or water (fresh water), while the circulating water will be water in the following description.

The water treatment system 220 according to the third embodiment comprises, other than the pipe 221, a heater 32 for heating raw water, and an evaporator 34 (a mist generator 35, a guide 36, and a group of demisters 37) provided at an evaporation area, as well as the first and second embodiments. In the water treatment system 220 according to this embodiment, a portion of the raw water heated by the heater 32 is gasified by the evaporator 34, and the gasified steam along with air are conducted to the condensation area 240, at which the steam condenses. Here, the condensation area 240 does not have to include the condenser 40, 140A to 140C of the first and second embodiments. Further, the water treatment system 220 according to the third embodiment comprises a pump, not shown in the drawings, for pneumatically feeding raw water, and a pump, not shown in the drawings, for pneumatically feeding the circulating water into the pipe 221.

The circulating water flowing inside the pipe 221 is heated by condensation heat (latent heat) generated at the condensation area 240. The circulating water flows inside the pipe 221, for example, by a pump, not shown in the drawings, and exchanges heat with steam at the condensation area 240 via the pipe 221. Ideally, the circulating water is heated up to temperature Thot that is the same as the one of the circulating air. Then, at the evaporator 34, air entering at temperature Tcold is heated not only by the heated seawater (temperature Theat) but also by the circulating water (temperature Thot). In this case, latent heat EL generated from an amount of distilled water Z is provided from sensible heat of heated seawater and the circulating water, where ideally relationship indicated by the following formula (3) is established. Here, X [ton/h] is inflow of seawater, and Y[ton/h] is inflow of the circulating water:

$$2400 \cdot Z = 4.2 \cdot \Delta T \cdot X + 4.2 \cdot (Thot - Tcold) \cdot Y. \tag{3}$$

Here, if an amount of temperature change of seawater $\Delta T$ is 5° C., temperature Thot is 95° C., temperature Tcold is 40° C., and Z=1.2 ton/h, the following formula (4) will be derived from the formula (3):

$$X + 11Y = 137 \text{ [ton/h]}. \tag{4}$$

Now, if Y is ten times as much as X, X is 1.23 ton/h, which is almost the same amount as the amount of the distilled water Z, described above. In such a case, as the first member of the right side of the formula (3) becomes 25.8 MJ/h and a production amount of the fresh water is Z=1.2 ton/h, energy for heating seawater to produce one ton of fresh water will be 6.0 kWh/(one ton of fresh water) almost equivalent to efficiency of RO. In addition, while RO is driven by electricity, the evaporation method only has to heat seawater without energy loss through power generation (for example, energy loss is approximately 60% for power generation according to heat generation), attaining higher efficiency than RO.

Although the formula (4) is a relational equation made in consideration of energy balance at the evaporator 34, as temperature of seawater is originally low, it is also considered to use condensation latent heat at the condensation area 240 for heating seawater. In such a case, latent heat generated at the condensation area 240 is used to heat seawater and the circulating water. For example, when seawater enters at temperature Tcold with inflow X at the start, and all latent heat generated at the condensation area 240 is used for heating seawater and the circulating water, relationship indicated by the following formula (5) is established:

$$2400 \cdot Z = 4.2 \cdot (Thot - Tcold) \cdot X + 4.2 \cdot (Thot - Tcold) \cdot Y. \tag{5}$$

Here, both formulas (3) and (5) become simultaneously true when an amount of temperature change $\Delta T$ of seawater at the evaporator 34 and an amount of temperature change of seawater (Thot−Tcold) at the condensation area 240 are equal. In other words, to reduce the heat amount of seawater at the evaporator 34, the amount of temperature change of seawater at the condensation area 240 (Thot−Tcold) needs to be reduced. Thus, as shown in a water treatment system 320 according to a variation of FIG. 10, it is preferable to perform heating of seawater at the condensation area 240 over a plurality of times with a multi-stage water treatment system.

Figure 10:
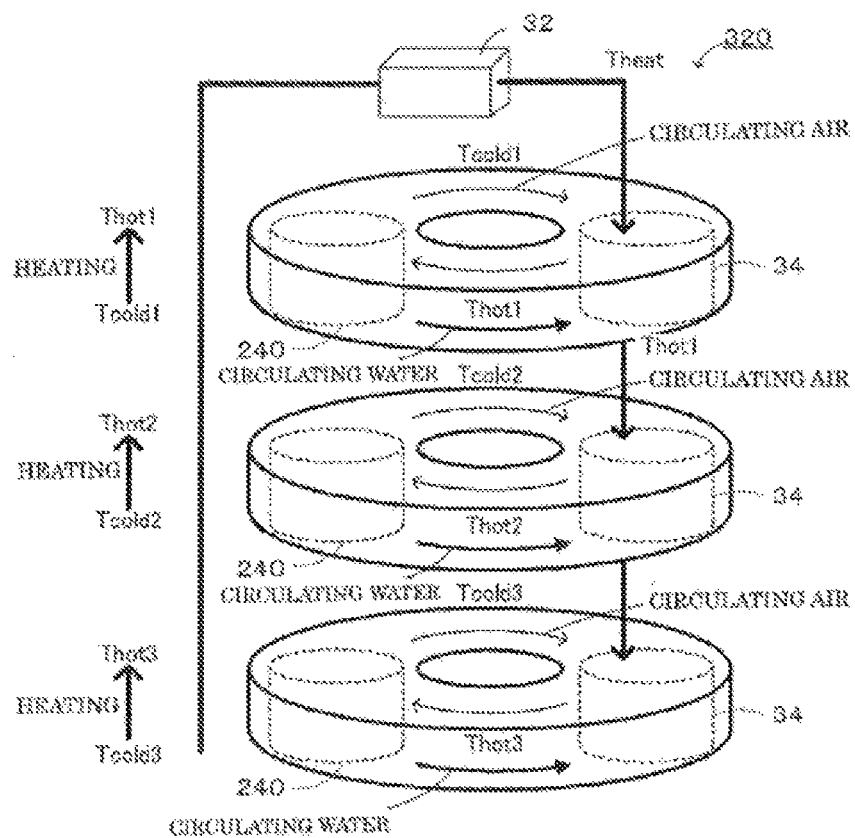
FIG. 10 is a diagram illustrating temperature changes of seawater and circulating air in a multistage-configured water treatment system.

In FIG. 10, the water treatment system 320 has three stages. It is noted that, in FIG. 10, the pipe 221 for flowing the circulating water is not shown. Also, for the sake of ease, heating of air and energy loss are ignored. Moreover, amounts of temperature change of seawater are the same at all stages of the water treatment system 320. The left side of FIG. 10 indicates seawater heated by latent heat of the condensation area 240. At the third stage of the water treatment system 320 (the first stage from the bottom), seawater is heated from temperature Tcold3 to temperature Thot3 along with the circulating water by condensation latent heat generated at the condensation area 240. The seawater heated to temperature Thot3 proceeds to the second stage of the water treatment system 320. Thus, temperature Tcold2 becomes equal to temperature Thot3 in FIG. 10. Similarly, at the second stage of the water treatment system 320, seawater is heated from temperature Tcold2 to temperature Thot2 by condensation latent heat generated at the condensation area 240, then, proceeds to the first stage (the third stage from the bottom) of the water treatment system 320. Likewise, at the first stage of the water treatment system 320, seawater is heated from temperature Tcold1 (Thot2) to temperature Thot1 by condensation latent heat generated at the condensation area 240, and eventually, heated by the external heater 32 to be seawater at temperature Theat. Here, an amount of temperature change of seawater by the heater 32 is assumed to be also equal to an amount of temperature change of seawater at each stage. When seawater enters the first stage of the evaporator 34, temperature of the seawater heated by the heater 32 is lowered to temperature Thot1 by latent heat. This seawater enters the second stage of the evaporator 34, while the temperature is lowered to temperature Thot2 by latent heat, in the same manner. The same thing goes at the third stage of the water treatment system 320.

An amount of water (fresh water) Z generated in such a way from each stage is expressed by the following formula (6) where (Thot−Tcold)=ΔT is defined in the formula (4). When considering that N (N is natural number) stages are defined to be stacked, heating of the heater 32 occurs only at the uppermost stage, and the power Ph of the heating is expressed by the following formula (7). Then, formulas (8) and (9) are derived, based on the formulas (6) and (7), by dividing heating power of the heater corresponding to an amount of water obtained from the whole N-stage water treatment system by fresh water production rate, that is, (Ph/(N·Z)) [MJ/(1 ton of fresh water)]:

$$Z = 4.2 \cdot \Delta T \cdot (X+Y)/2400 \quad (6)$$

$$Ph = 4.2 \cdot \Delta T \cdot X \quad (7)$$

$$Ph/(N \cdot Z)[\text{MJ/t}] = 2400 \cdot X/(N \cdot (X+Y)) \quad (8)$$

$$Ph/(N \cdot Z)[\text{kWh/t}] = 670 \cdot X/(N \cdot (X+Y)). \quad (9)$$

Then, if Y is tenfold of X, and the number of stages N is ten, the efficiency of the water treatment system becomes 6.1 kWh/(1 ton of fresh water). As a comparison, the efficiency of RO, when electrical production efficiency is 40%, is 15 kWh/(1 ton of fresh water). It is understood that the water treatment system of this embodiment that comprises a pipe 221 for circulating the circulating water is superior.

Figure 11:
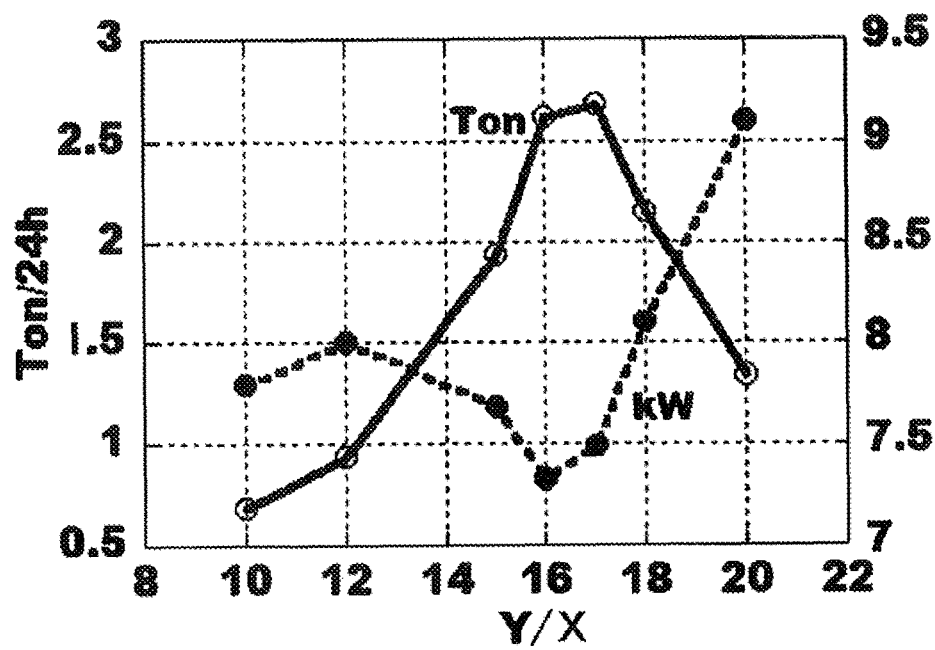
FIG. 11 is a diagram showing a simulation result of relationships from a circulation amount of circulating water, an amount of water obtained from a water treatment system, and energy required for heating.
Figure 12:
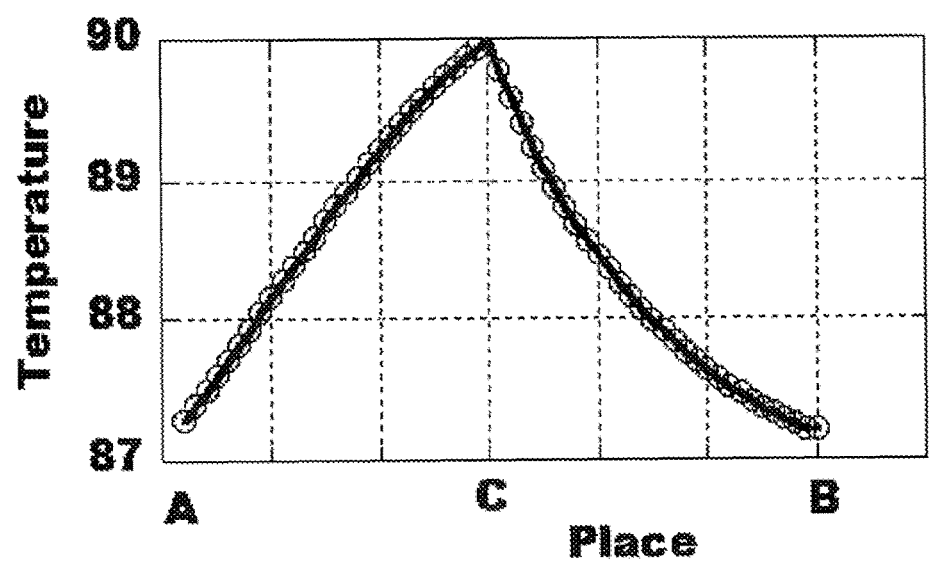
FIG. 12 is a diagram showing a temperature distribution of circulating water at each location.

FIG. 11 is a diagram showing a simulation result of relationships among a circulating amount of circulating water Y, an amount of water W [ton/24 hours] obtained for each 24 hours from the water treatment system 220, and power Ph [kW] required for heating, in a one-stage water treatment system 220, when a circulating amount of air is 2700 m³/h, temperature Theat of air that passes through the evaporator 234 is 95° C., temperature Tcold of air that passes through the condensation area 240 is 85° C., and inflow X of seawater is 1.2 ton/hour. It is noted that, in FIG. 11, a solid line indicates an amount of water W and a dashed line indicates power Ph. As shown in FIG. 11, a production amount of fresh water of the water treatment system 220 becomes the greatest and energy required for heating becomes less when a circulating amount Y of the circulating water is around 17 times as much as inflow X of seawater. FIG. 12 shows temperature distribution of the circulating water when Y is 17-fold of X. FIG. 12 shows temperature of the circulating water at each place when seawater at 95° C. enters at place C in the middle. As shown in FIG. 12, it is indicated that the circulating water is 90° C. at place C where seawater flows in, and an amount of temperature change between the seawater and the circulating water at the evaporator 34 is around 5° C. Then, the circulating water continuously flows from place B to place A, and joins, at place A, the seawater at 85° C. that is just before proceeding to the heater 32. On the contrary, as the circulating water maintains 87° C. or higher of temperature at place A in FIG. 12, albeit the entering seawater being 85° C., it is understood that the circulating water retains a large amount of energy. Further, from an example shown in FIG. 12, it is understood that the circulating water sufficiently contributes to energy recovery. It will be appreciated that, although results shown in FIGS. 11 and 12 are based on a one-stage system, similar results will be expected when a multi-stage system is used. When a multi-stage system is used, while a production amount of fresh water increases, the heater heats only the seawater after passing through the first stage, thus, energy required for a production amount of fresh water decreases as the number of stages increases.

The above-described water treatment systems 220 and 320 according to the third embodiment obtain condensed water by heating raw water, gasifying a portion thereof by the evaporator 34, and condensing the gasified steam at the condensation area 240. The water treatment systems 220 and 320 comprise a heater 32 for heating raw water, a steam conductor (a guide 36 and a mist generator 35) for conducting the steam gasified from the raw water heated by the heater 32 to the condensation area 240, a pipe 221 for conducting circulating water from the condensation area 240 to the evaporator 34 and causing heat exchange between the steam conducted to the condensation area 240 by the steam conductor and the circulating water, as well as causing heat exchange between raw water and the circulating water at the evaporator 34. In this way, at the condensation area 240, the circulating water is heated by latent heat for condensing steam, and at the evaporator 34, heat for gasifying raw water is added by the circulating water. Thus, latent heat for condensing steam at the condensation area 240 is able to be efficiently used, thereby providing a water treatment system with high performance in water treatment.

It is noted that, while the water treatment systems 220 and 320 according to the third embodiment comprise a pipe 221 for circulating water, instead of the pipe 221, for example, a meandering or plate-type heat exchanger may be used at the condensation area 240 and the evaporation area so as to promote heat exchange at the condensation area 240 and the evaporation area. Further, while the circulating water preferably circulates in the opposite direction to the airflow inside the system, the circulating water may circulate along the airflow or be conducted irrelevant to the airflow as long as the circulating water is conducted from the condensation area 240 to the evaporation area and performs heat exchange with steam and raw water.

The present invention is able to be modified and applied in a variety of ways without limitation to the above-described embodiments. For example, a pipe 221 for circulating water may also be provided in the water treatment systems 20 and 120 of the first and second embodiments.

Figure 13:
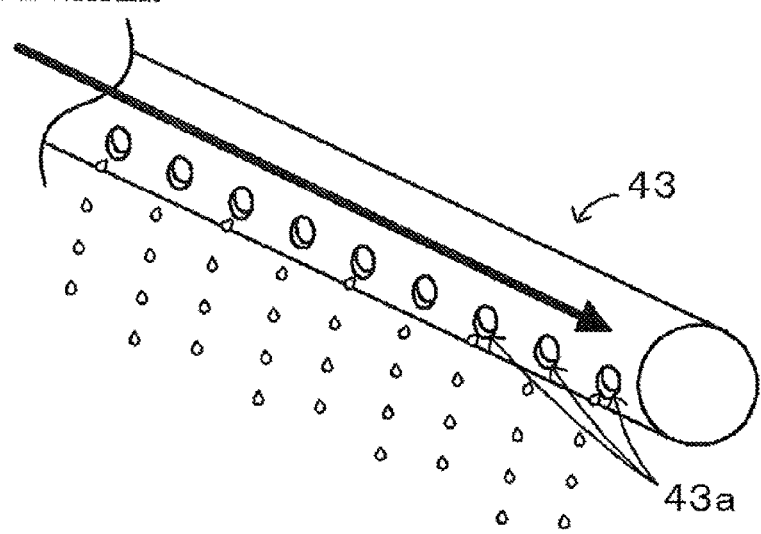
FIG. 13 is a perspective view showing an example of a perforated pipe for dropping water to a condensation area.
Figure 14:
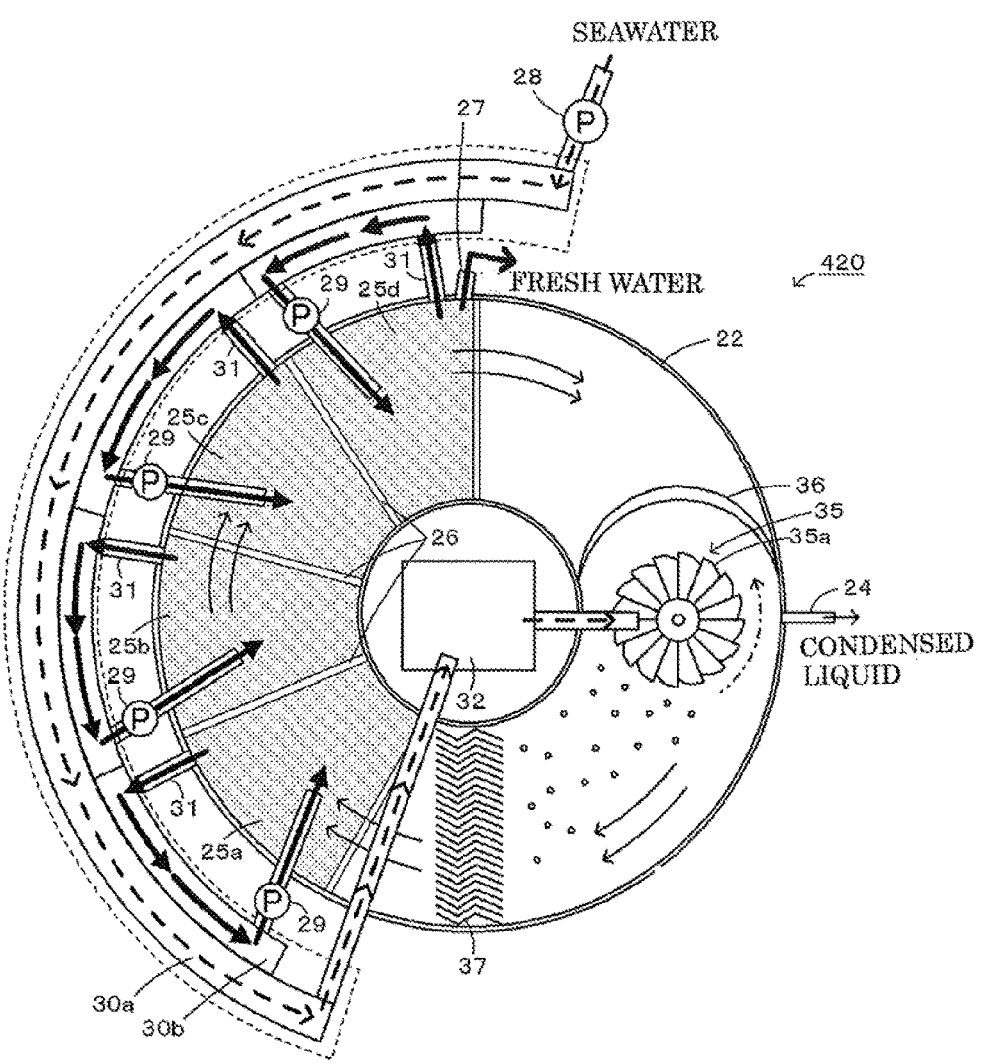
FIG. 14 is a top view schematically showing an outline of a configuration of an alternative water treatment system.

Further, while, in the above-described embodiments, the condenser 40 conducts fresh water to a tray 41 with a plurality of holes 41a formed on the bottom thereof so as to drop the fresh water from the tray 41, the condenser 40 may take other configurations, such as the one shown in FIG. 13 where fresh water is conducted to a pipe 43 with a plurality of holes 43a formed on the side so as to drop the fresh water from the plurality of holes 43a. Further, instead of or in addition to such a feature of dropping fresh water, it may take configuration so that fresh water is atomized and conducted to the condensation area. Further, while the mesh plate 42 is disposed below the tray 41 in the above-described embodiments, the mesh plate 42 may not necessarily be provided.

In the above-described embodiments 1 and 2, it is configured that the fresh water collected in the liquid pools 25a to 25d is conducted through the pipes 31 to the heat exchanger 30 and joins one another sequentially from the fresh water obtained at the upstream side of the condensation area. However, as shown in an alternative water purification device 420 of FIG. 14, it may be configured that the pumps 29 are equipped at plurally partitioned liquid pools 25a to 25d, respectively, to conduct the fresh water to the heat exchanger 30. In the alternative water purification device 420, fresh water collected in the liquid pools 25a to 25d circulates the flow path 30b of the heat exchanger 30 without mixing one another. Further, in the alternative water purification device 420, the tray 41 of the condenser 40 is divided into four with partitions (not shown in the drawings) in a way to match the divisions of the liquid pools 25a to 25d of the case 22 as viewed from vertically above. Then, each of the fresh water pneumatically fed from the liquid pools 25a to 25d by the pumps 29 is conducted to the divided positions of the tray 41 each of which is located vertically above the liquid pools 25a to 25d, respectively, through the heat exchanger 30. Having such a configuration, the temperature gradient of fresh water collected in the liquid pools 25a to 25d becomes conspicuous, whereby raw water is effectively heated, improving water treatment performance.

Further, in the alternative water treatment system 420, liquid pools 25a to 25c at the upstream side may be configured so that when fresh water is collected over a predetermined height of the liquid pools 25a to 25c, overflowed fresh water is passed on to liquid pools 25b to 25d by one level at the downstream side (for example, fresh water overflowed from the liquid pool 25a is passed on to the liquid pool 25b). The liquid pool 25d at the most downstream side may be configured so that overflowed fresh water is collected to a water tank, not shown in the drawings, outside the case 22 through the catchment pipe 27, or fresh water overflowed from all the liquid pools 25a to 25d is collected to an external water tank.

While the embodiments of the present invention have been described so far, it should be appreciated that the invention is not limited to the above-described embodiments, and may be varied in a variety of ways (including omission of components) within the scope and spirit of the invention.

The present application is based on Japanese Patent Application No. 2012-089708 filed as of Apr. 10, 2012. Whole specification, claims, and drawings of Japanese Patent Application No. 2012-089708 are incorporated herein by reference.

REFERENCE SIGNS LIST 20, 120, 120A, 220, 320, 420 Water treatment system
22 Case
23 Liquid pool
24 Drainage pipe
25, 25a to 25d Liquid pool
26 Partition
27 Catchment pipe
28, 29 Pump
30 Heat exchanger
31 Pipe
32 Heater
34 Evaporator
35 Mist generator
35a Fin
35b Drive source
36 Guide
37 Group of demisters
40 Condenser
41 Tray
42 Mesh plate
50 Airflow guide
51, 51a to 51c Guide plate
221 Pipe
240 Condensation area

The invention claimed is:

1. A water treatment system that heats raw water, gasifies a portion thereof at an evaporation area, and condenses gasified steam at a condensation area to obtain condensed water, the water treatment system comprising:
   a heater configured to heat the raw water;
   a steam conductor configured to conduct, to the condensation area, steam that is gasified from the raw water heated by the heater in a direction;
   a circulating water pipe configured to conduct, independently from the raw water, circulating water which is different from the raw water from the condensation area to the evaporation area in a direction opposite to the direction in which the steam conductor conducts the steam, causes the circulating water flowing inside the circulating water pipe to be heated by latent heat for condensing the steam at the condensation area, and causes the circulating water to add the heat generated at the condensation area to the steam at the evaporation area;
   a heat exchanger configured to heat the raw water and, at the same time, cools down the condensed water by causing heat exchange between the raw water and the condensed water; and
   a condensed water conductor configured to conduct at least a portion of the condensed water obtained at the condensation area to the heat exchanger, and causes the condensed water that is cooled down by the heat exchange with the raw water to perform a vapor-liquid contact at the condensation area with the steam gasified from the raw water;
   wherein the condensed water conductor conducts the condensed water so that the condensed water that is obtained at an upstream side of the direction in which the steam conductor conducts the steam, from the condensed water obtained at the condensation area, exchanges heat with a downstream side of raw water passing through the heat exchanger and the condensed water obtained at a downstream side of the direction in which the steam conductor conducts the steam exchanges heat with an upstream side of the raw water passing through the heat exchanger;
   wherein the condensed water conductor drops or sprays, from vertically above down to the condensation area, the condensed water that is cooled down by the heat exchange with the raw water to cause the condensed water to perform a vapor-liquid contact with the steam gasified from the raw water.

2. The water treatment system according to claim 1, wherein the circulating water pipe conducts a greater amount of the circulating water per unit time than condensed water obtained at the condensation area.

3. The water treatment system according to claim 1, wherein
the condensed water conductor divides the condensed water obtained at the condensation area into plural portions according to the direction in which the steam conductor conducts the steam, and conducts the condensed water so that each of the divided condensed water exchanges heat one after another with the raw water passing through the heat exchanger.

4. The water treatment system according to claim 1, wherein the condensed water conductor further comprises:
a dropper configured to drop the condensed water that is cooled down by the heat exchange with the raw water; and
a crusher configured to crush the condensed water dropped, disposed below the dropper.

5. The water treatment system according to claim 1, wherein
the condensed water conductor, comprising a tray with a plurality of holes formed on a bottom, conducts the condensed water that is cooled down by the heat exchange with the raw water to the tray, and drops the condensed water through the plurality of holes.

6. The water treatment system according to claim 1, wherein
the condensed water conductor, comprising a cylindrical member with a plurality of holes formed on a side surface, conducts the condensed water that is cooled down by the heat exchange with the raw water into the cylindrical member, and drops the condensed water through the plurality of holes.

7. The water treatment system according to claim 1, further comprising a container having the condensation area thereinside,
wherein the heat exchanger is disposed outside the container.

8. The water treatment system according to claim 1, wherein the heat exchanger is a plate-type heat exchanger.

* * * * *